United States Patent [19]
Uhm

[11] Patent Number: 5,478,532
[45] Date of Patent: Dec. 26, 1995

[54] LARGE SCALE PURIFICATION OF CONTAMINATED AIR

[75] Inventor: Han S. Uhm, Potomac, Md.

[73] Assignee: The United States of America as represented by the Secretary of the Navy, Washington, D.C.

[21] Appl. No.: 438,593

[22] Filed: May 10, 1995

Related U.S. Application Data

[62] Division of Ser. No. 749,244, Aug. 23, 1991.

[51] Int. Cl.$^6$ .................................................. B01J 19/08
[52] U.S. Cl. ........................................ 422/186; 422/906
[58] Field of Search ................................ 422/168, 186, 422/906; 204/157.44, 157.6, 158.2

[56] References Cited

U.S. PATENT DOCUMENTS

| | | | |
|---|---|---|---|
| 4,076,606 | 2/1978 | Suzuki et al. | 204/157.1 R |
| 4,345,983 | 8/1982 | Wan | 204/158 R |
| 5,137,701 | 8/1992 | Mundt | 432/210 |

FOREIGN PATENT DOCUMENTS 158823  3/1995  European Pat. Off. .

*Primary Examiner*—Donald P. Walsh
*Assistant Examiner*—Daniel Jenkins
*Attorney, Agent, or Firm*—Jacob Shuster

[57] ABSTRACT

A weakly ionized plasma is generated by continuous high-power microwave within a dielectric cavity positioned in a slow waveguide. Contaminated air under atmospheric pressure is exposed to the plasma within the waveguide cavity for a limited saturation time controlled by inflow at a regulated flow rate. During such limited saturation time, the contaminated air is purified by sequential ionization and recombination under an electron temperature resulting in a microwave discharge plasma dominated by atomic oxygen at a relatively high saturation density level together with atomic nitrogen at a relatively low density level.

7 Claims, 6 Drawing Sheets

5,478,532

LARGE SCALE PURIFICATION OF CONTAMINATED AIR

This application is a division of prior pending application Ser. No. 07/749,244, filed Aug. 23, 1991, now pending.

BACKGROUND OF THE INVENTION

This invention relates generally to purification of contaminated air on a large scale basis by exposure to the decomposing action of microwave energy generated plasma.

Because of air contamination by pollutants such as volatile organic compounds and chlorofluorocarbons, a considerable amount of technology and scientific data has been developed in recent years regarding air purification involving microwave decomposition of air by plasma to produce a higher degree of ionization and dissociation of the pollutants as compared to other types of electrical excitation techniques. Further, because of a relatively high electron-to-gas temperature ratio involved in use of the microwave plasma technique for air purification, the plasma carrier gas remains moderately cool which is beneficial when the air is contaminated by carbon-based compounds.

Previous plasma processes for air purification involved corona discharge, dielectric barrier discharge and pulse glow discharge. Various disadvantages are associated with such known processes such as non-uniformity of operation, lack of control, energy loss, bulkiness of associated apparatus and complexity, etc.

It is therefore an important object of the present invention to provide a novel plasma processing system for air purification which avoids all of the aforementioned drawbacks of prior known plasma processes.

SUMMARY OF THE INVENTION

In accordance with the present invention, high-power microwave energy is continuously and efficiently transferred at a resonance frequency to a dielectric chamber under atmospheric pressure. The dielectric chamber is in a cavity of a slow waveguide within which an electric field is concentrated. Contaminated air as the carrier gas is enclosed within the dielectric chamber and the pollutants are decomposed in response to oxidation by atomic oxygen or by electron induced dissociation. Atomic oxygen is generated from the dissociative recombination of diatomic oxygen ions, as ionization products, with plasma electrons. The oxidation process is limited to a oxygen-atom density saturation time during which a dominant saturation density is achieved for oxygen-plasma under a low plasma electron temperature. Inflow of the contaminated air to the dielectric chamber is accordingly regulated at a constant flow rate determined by the life time of the contamination chemicals or the aforementioned oxygen-atom saturation density under given microwave power and plasma volume conditions.

BRIEF DESCRIPTION OF THE DRAWING

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
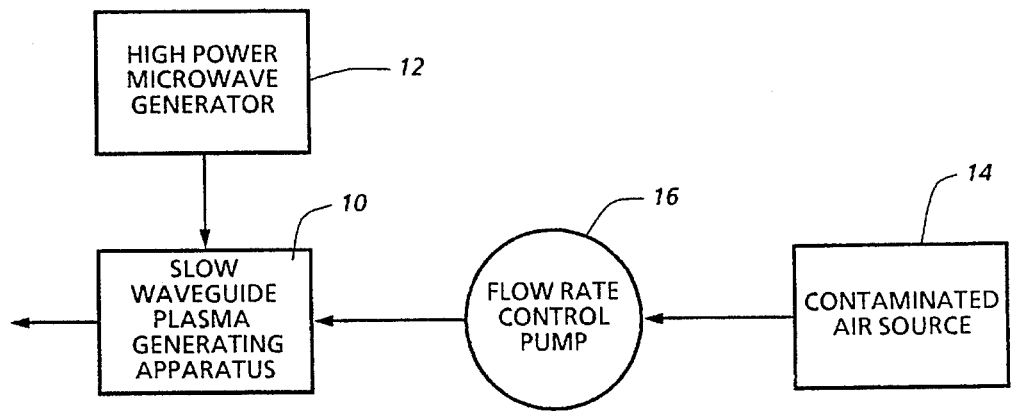
FIG. 1 is a block diagram schematically illustrating apparatus in accordance with the present invention.

Referring now to the drawing in detail, FIG. 1 diagrams a slow waveguide apparatus 10 within which a relatively long cylindrical volume of plasma is produced by high-power microwave energy introduced thereto from a generator 12 Reference numeral 14 denotes a relatively high volume source of air, contaminated for example by toxic pollutants such as volatile organic compounds and various chlorofluorocarbons. The contaminated air from source 14 is introduced into the slow waveguide apparatus 10 at a flow rate controlled by pump 16 for large scale purification purposes as explained hereinafter.

Figure 2:
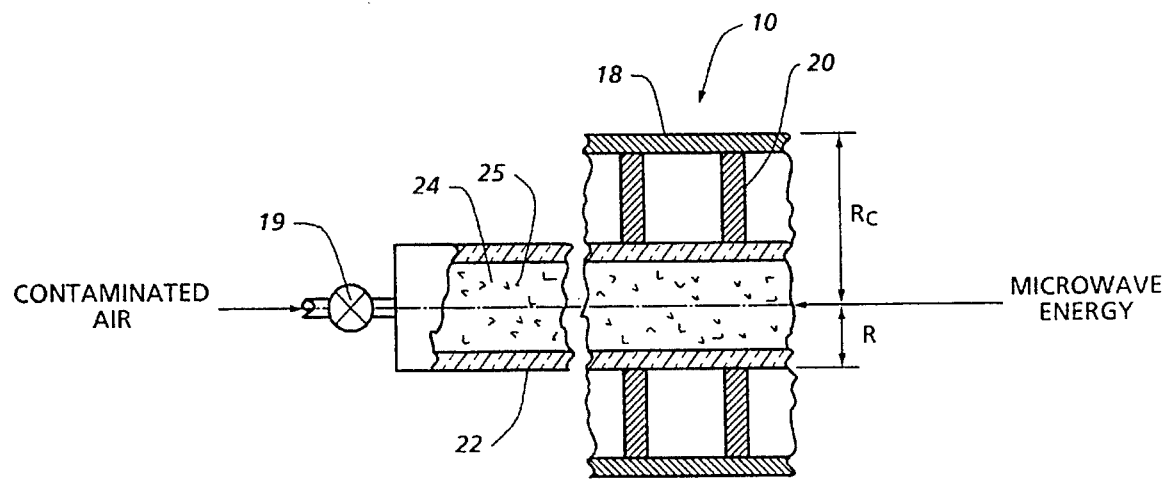
FIG. 2 is a partial side section view of a waveguide constructed in accordance with one embodiment of the present invention.

The slow waveguide apparatus 10 according to one embodiment of the invention as illustrated in FIG. 2, is of the hollow, disk-loaded type including an outer cylindrically tubular housing 18 made of electrically conductive material enclosing a large volume cavity into which the contaminated air is introduced through a suitable valve 19. A plurality of axially spaced copper disks 20 are positioned within the cavity of housing 18 surrounding a central tube 22 made of dielectric material such as quartz to enclose therein a large volume plasma chamber 24 to be filled with the contaminated air as the carrier gas within which the plasma is generated by the microwave energy transferred thereto from generator 12. The openings in disks 20 and the dielectric plasma tube 22 extending therethrough have a radius R as denoted in FIG. 2 while the outer radius of the disks or cavity is denoted as Rc.

When a microwave electric field is applied to the interior of the waveguide housing 18 by generator 12, electrons therein are accelerated and collide with neutral gas-molecules, producing ions and secondary electrons. Air breakdown within the electric field occurs when the electron production rate is larger than the loss rate. For a continuously oscillating microwave field, there is a threshold value for which electron production rates exceed loss rates. This threshold field is a function of the ionization potential of the carrier in the dielectric chamber gas, the electron collision properties in the gas, the geometry of housing 18 and the microwave frequency.

The threshold electric field E for air breakdown is expressed as $$E=30\,p,$$

where the air pressure p is greater than 10 Torr and the electric field E is in units of volt/cm. Equation (1) is valid when the electron collision frequency is much larger than the microwave frequency. The microwave power P required for air breakdown in waveguide cavity of radius R and length d is roughly estimated from $$P = \frac{\omega}{Q} \frac{E^2}{4} R^2 d, \qquad (2)$$

where $\omega$ is the microwave frequency and Q is the cavity Q-value. For example, the Q-value for the cylindrical waveguide cavity illustrated in FIG. 2 is given by $$Q = \frac{\mu/\mu_c}{1 + d/R} \quad \frac{d}{\delta},\tag{3}$$

where $\mu_c$ is the relative permeability of the wall of cavity housing 18, the skin depth $\delta$ of the wall is expressed as $$\delta = \frac{c}{\sqrt{2\pi\mu_c\omega\sigma_w}},\tag{4}$$

and $\sigma_w$ is the conductivity of the cavity wall.

Transverse magnetic (TM) mode of operation of the disk-loaded waveguide apparatus 10 hereinbefore described involves concentration of microwave field energy at the axis of tube 22 having a large effective radius R for the wall of plasma chamber 24. In this regard the value of d/R in the denominator of Equation (3) is readily maintained less than ten. Assuming that the housing 18 is made of silver, copper or aluminum, the Q-value of the system may be more than $4 \times 10^4$ for d=100 cm with a microwave frequency of 1 GHz. Substituting Equation (1) into Equation (2) and assuming that the field energy is concentrated within the tube 22 of radius R=2 cm, the microwave power P required for air breakdown is determined as P≈8 kW for full atmospheric air density at room temperature and wherein the volume of breakdown air is about $10^3$ cm$^3$ for d=100 cm. There are several ways to reduce the threshold field for air breakdown. First, small metal fragments 25 may be installed in the cavity of chamber 24, so that sharp points of the fragments emit electrons to induce early breakdown. Second, a small amount of radioactive material may be placed inside the cavity, where for example the gamma ray generates free electrons. Third, a resistive wire may be installed in the cavity. Thermionic electrons emitted from such wire along the electric field lines reduce the breakdown field. Finally, electrons in a local breakdown migrate into other regions to help early breakdown thereat. Once air breakdown is initiated and a microwave discharge is developed, the average electron energy T in the gas volume is determined from $$T = 0.91 + 0.03 \; E/p,\tag{5}$$

where the energy T is in unit of eV.

Figure 3:
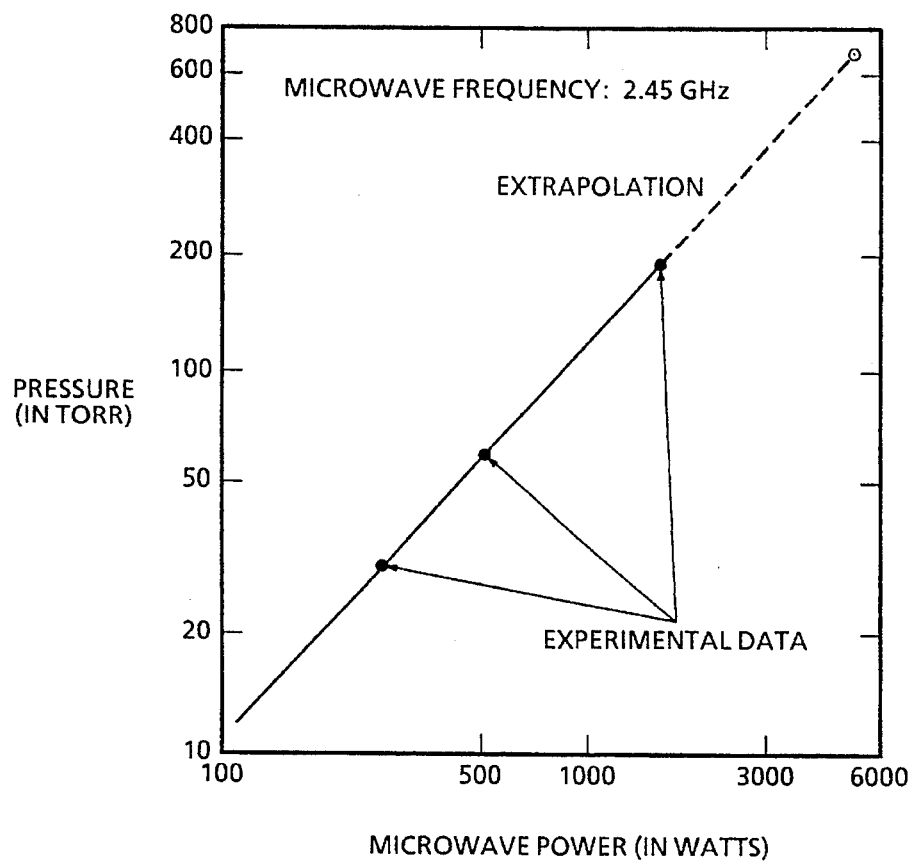
FIGS. 3–12 are graphical representations of data characterizing various factors associated with the present invention.
Figure 4:
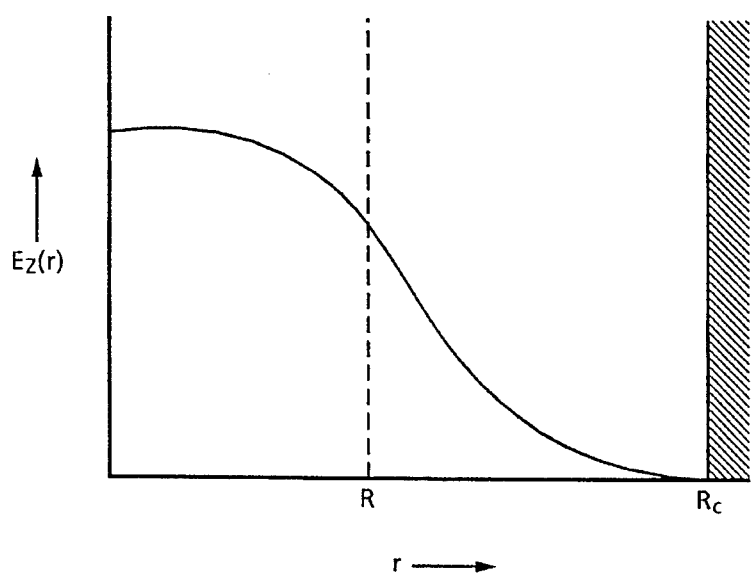
Figure 5:
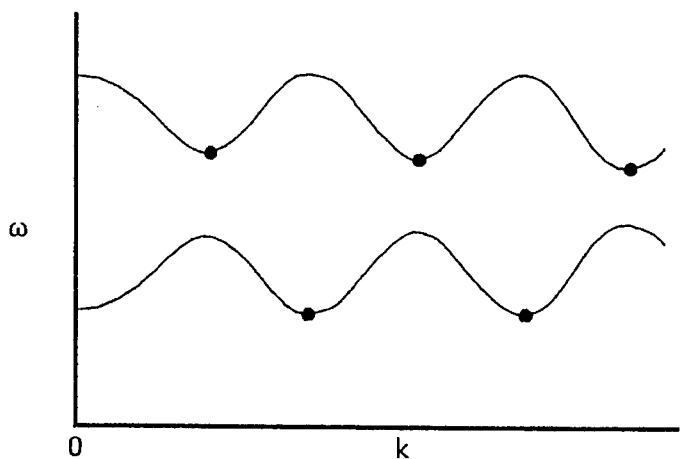

Reliable plasma was heretofore achieved under conditions of reduced air density of the carrier gas up to 200 Torr as shown in FIG. 3, where dots represent experimental data. The solid line in FIG. 3 is obtained from the least square fit of the experimental data. Extrapolation of such data along the dotted line in FIG. 3 indicates that plasma generation at the full air density with a pressure of p=760 Torr requires a high microwave power of more than 5 kW in order to generate a large volume of plasma in apparatus 10. FIG. 4 is a graphical presentation of the electrical field profile in disk-loaded waveguide apparatus 10, where R and $R_c$ represent the inner and outer radii, respectively, of disks 20 and wherein the plasma generated by the microwave energy from generator 12 fills the cavity of dielectric tube 22 of radius R. Shown in FIG. 4 is the axial electric-field profile obtained during one dominating TM mode wherein most of the electromagnetic field energy is concentrated inside the dielectric tube 22. The electric field outside the tube 22 reduces drastically as the radial coordinate r approaches the radius $R_c$ of the conducting wall of housing 18. Air breakdown and plasma generation occur at a resonance frequency at which the group velocity of the wave energy vanishes, as indicated by black dots in FIG. 5. In this frequency regime, the microwave energy is transferred efficiently into the plasma.

The dielectric constant of a weakly ionized plasma generated by the microwave energy is expressed as $$\epsilon = 1 - i\frac{\omega_p^2}{\omega\nu},\tag{6}$$

where $\omega_p$ is the electron plasma frequency, $\nu$ is the collisional frequency of electrons with neutrals in the plasma chamber 24 and the symbol i represents the imaginary value. Equation (6) is valid only for the case of $\nu \gg \omega$. The scattering cross section of electron by neutrals is in the order of $10^{-15}$ cm$^2$ for the electron energy T in the order of 1 eV. Since the dominant neutral species in the air are nitrogen and oxygen molecules, the collisional frequency $\nu$ for full air density with molecular density of $2.5 \times 10^{19}$ cm$^{-3}$ is given by $$\nu = 1.05 \times 10^{12} \sqrt{T},\tag{7}$$

where T is the average electron energy obtained from Equation (5). Assuming that the density of the weakly-ionized plasma is $n_p = 10^{11}$ cm$^{-3}$, it is shown that the dielectric constant in Equation (6) is given by $\epsilon = 1 - 0.05i$ for electron temperature of about 1 eV and $\omega = 6 \times 10^9$ rad/sec corresponding to a wave frequency of 1 GHz. Therefore, the weakly-ionized plasma generated by the microwave energy is reasonably microwave transparent when the plasma density satisfies $\omega_p^2 \ll \omega\nu$, where Equation (7) indicates that the weakly-ionized plasma generated by microwaves is in the collision-dominated regime for full air density.

After air breakdown is initiated and the microwave discharge is developed, the current density J in the plasma is related to the electric field E by J=$\sigma$ as defined by $$\sigma = \frac{\omega_p^2}{4\pi\nu}.\tag{8}$$

Therefore, the electric field E is related to the microwave power P by $$P = \sigma E^2 \Delta V,\tag{9}$$

where $\Delta V$ represents the volume of the microwave-generated plasma. Assuming that the volume and density of the plasma generated by high power microwave energy of P=8 kW are $\Delta V = 10^3$ cm$^3$ and $n_p = 10^{11}$ cm$^{-3}$, respectively, the electric field strength is determined as E=700 volt/cm for the electron temperature T=1 eV, which is consistent with Equation (5) from which T=0.94 eV for E=700 volt/cm and p=760 Torr is predicted.

To estimate the plasma density in the microwave gas-discharge, the continuity equation $$\frac{dn_p}{dt} = 2\frac{n_p}{\zeta} - \alpha n_p^2,\tag{10}$$

is utilized in connection with plasma electrons. In Equation (10), $n_p$ represents the plasma density where the saturation-time parameter $\zeta$ is defined by $$\frac{2}{\zeta} = \int [n_N \sigma_N(x) + n_O \sigma_O(x)] \upsilon f(x) dx,\tag{11}$$

and the coefficient a is defined by $$a = \frac{a_N n_{pN} + a_O n_{pO}}{n_p}, \tag{12}$$

where $n_N$ and $n_O$ represent the neutral densities of nitrogen and oxygen molecules, respectively, $n_{pN}$ and $n_{pO}$ represent the densities of diatomic nitrogen and oxygen ions, respectively and the velocity v of the plasma electrons is related to the electron energy x by $v=6\times10^7 \, x^{0.5}$ cm/sec. The energy x is in units of eV while the densities of nitrogen and oxygen molecules is given by $n_N=2\times10^{19}$ cm$^{-3}$ and $n_O=5\times10^{18}$ cm$^{-3}$, respectively, at full air density. The energy distribution function f(x) of the plasma electrons in Equation (11) is defined by $$f(x) = \frac{1}{T} \exp\left(\frac{x}{T}\right), \tag{13}$$

where the average electron energy T is obtained from Equation (5).

Figure 6:
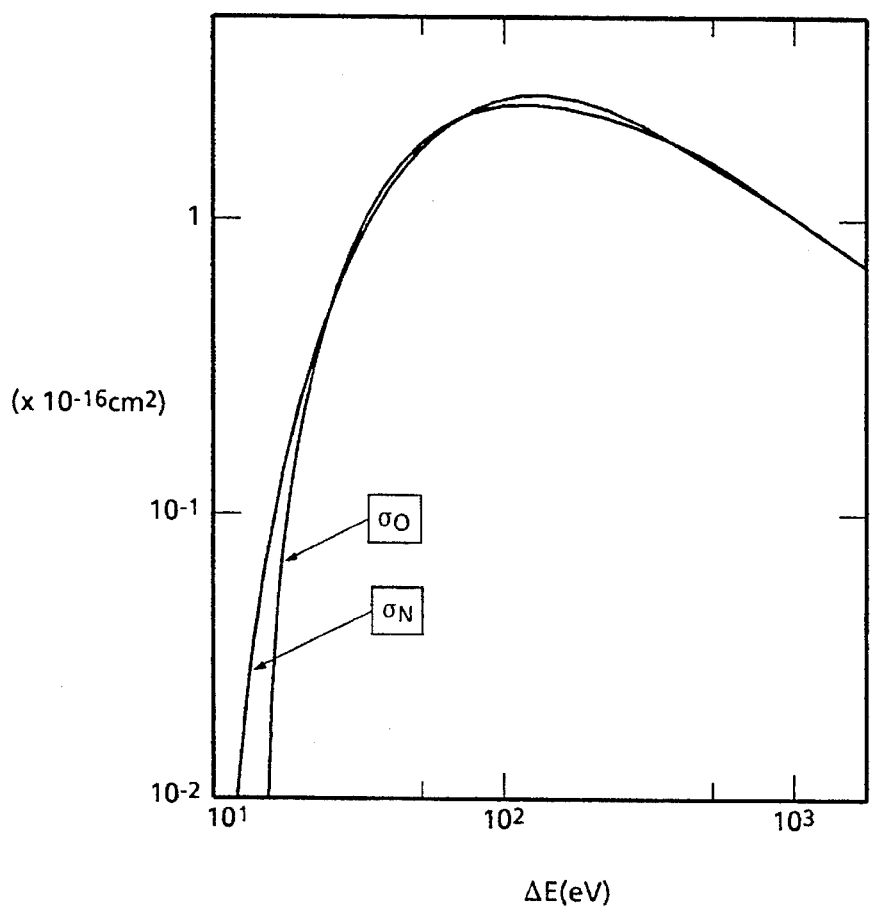
Figure 7:
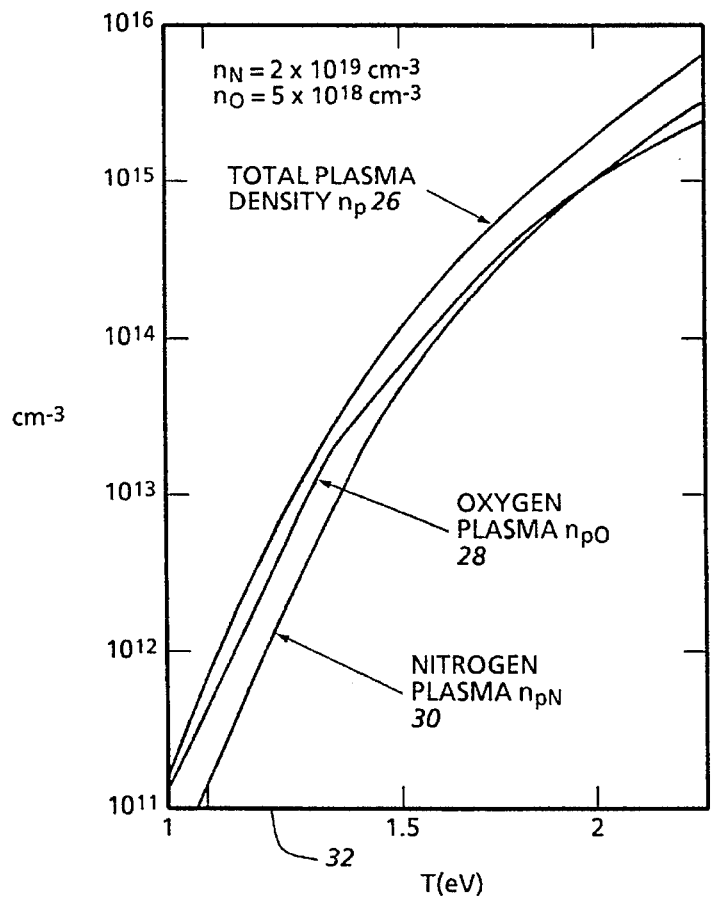

In Equation (11), $\sigma_N(X)$ and $\sigma_O(x)$ represent the total ionization cross sections of nitrogen and oxygen molecules by the plasma electrons as graphically illustrated in FIG. 6, where plots of the ionization cross sections versus the electron energy are obtained from theoretical and experimental data. FIG. 6 indicates that the ionization cross section of oxygen molecules dominates when the energy ΔE of ionizing electrons is relatively low, satisfying ΔE<22 eV and the ionization potentials of oxygen and nitrogen molecules are 12.063 eV and 15.576 eV, respectively. On the other hand, the ionization cross section of nitrogen molecules is larger than that of oxygen molecules when ΔE>22 eV. The coefficients $\alpha_N$ and $\alpha_O$ in Equation (12) represent the recombination coefficients of diatomic nitrogen and oxygen ions, respectively. In a low-density plasma, recombination of electrons and positive ions occurs through the radiative recombination process, wherein a typical recombination coefficient is $10^{-12}$ cm$^3$ sec$^{-1}$ at room temperature. The radiative recombination coefficient decreases drastically as the temperature of electrons and ions increases. At high neutral particle densities, the three-body recombination process plays an important role. For positive ions moving in helium gas with a number density of $10^{19}$ cm$^{-3}$ at a temperature of 250° K, the rate coefficient has been computed to be about $10^{-8}$ cm$^3$ sec$^{-1}$. The rate coefficients are larger for ions moving in molecular gases because of energy losses by rotational and vibrational excitation. However, the three-body recombination coefficient reduces drastically as the electron temperature increases. The most dominant recombination is the dissociative recombination, which proceeds by radiationless transitions and therefore occurs more rapidly than radiative transition. At room temperature, the dissociative recombination coefficients of the diatomic nitrogen and oxygen ions are given by $\alpha_N=2.7\times10^{-7}$ cm$^3$ sec$^{-1}$ and $\alpha_O=1.8\times10^{-7}$ cm$^3$sec$^{-1}$, respectively. The dissociative recombination coefficient in a particular vibrational level varies approximately with electron temperature T as $T^{-0.5}$. Thus, the dissociative recombination coefficients for diatomic nitrogen and oxygen ions are expressed as $$\alpha_N(T) = 4.3\times10^{-8}\frac{1}{\sqrt{T}} \quad \alpha_O(T) = 2.7\times10^{-8}\frac{1}{\sqrt{T}}, \tag{14}$$

where the electron temperature T defined in Equation (5) is in units of eV. The dissociative type recombination process dominates in the microwave-discharge plasma with an electron temperature of about 1 eV. The continuity equation (10) is a very simplified analysis omitting such factors as plasma electron loss due to diffusion and ionization of neutrals by radiation from the recombination of nitrogen and oxygen atoms in forming various molecules. The rate equations of the diatomic nitrogen and oxygen ions are expressed as $$\frac{dn_{pN}}{dt} = n_N n_p \int \sigma_N v f(x)dx - \alpha_N n_p n_{pN}, \tag{15}$$

$$\frac{dn_{pO}}{dt} = n_O n_p \int \sigma_O v f(x)dx - \alpha_O n_p n_{pO},$$

where the plasma density $n_p$ is calculated from $n_p = n_{pN}+n_{pO}$. The steady-state rate equation of the plasma is given by $$n_p = \frac{n_N}{\alpha_N}\int \sigma_N v f(x)dx + \frac{n_O}{\alpha_O}\int \sigma_O v f(x)dx, \tag{16}$$

where the energy distribution function f(x) is defined in Equation (13). FIG. 7 presents a plot 26 of the steady-state plasma density $n_p$ versus the electron temperature T obtained from Equation (16) for full air density with $n_N=2\times10^{19}$ cm$^{-3}$ and $n_O=5\times10^{18}$ cm$^{-3}$. Shown in FIG. 7 are also plots 28 and 30 of oxygen and nitrogen plasma densities. In obtaining the steady-state plasma density plot 26 in FIG. 7, use was made of the ionization cross sections of FIG. 6 and of the recombination coefficients in Equation (14). The plasma density $n_p$ increases drastically as the electron temperature T increases, as shown in FIG. 7, which also indicates that the electron density for a temperature of T=0.94 eV is approximately given by $n_p=3\times10^{11}$ cm$^{-3}$. The horizontal scale 32 in FIG. 7 starts from T=0.9 eV because the electron temperature of the microwave-discharge plasma is always larger than 0.9 eV as indicated by Equation (5). From FIG. 7 it is also evident that the oxygen plasma dominates for a relatively low electron temperature satisfying T<1.3 eV, which is consistent with the ionization cross section of oxygen molecules diagrammed in FIG. 6. However, the nitrogen-plasma density at a electron temperature T higher than 2 eV is comparable to or larger than the oxygen-plasma density as shown by curves 28 and 30 in FIG. 7.

Figure 8:
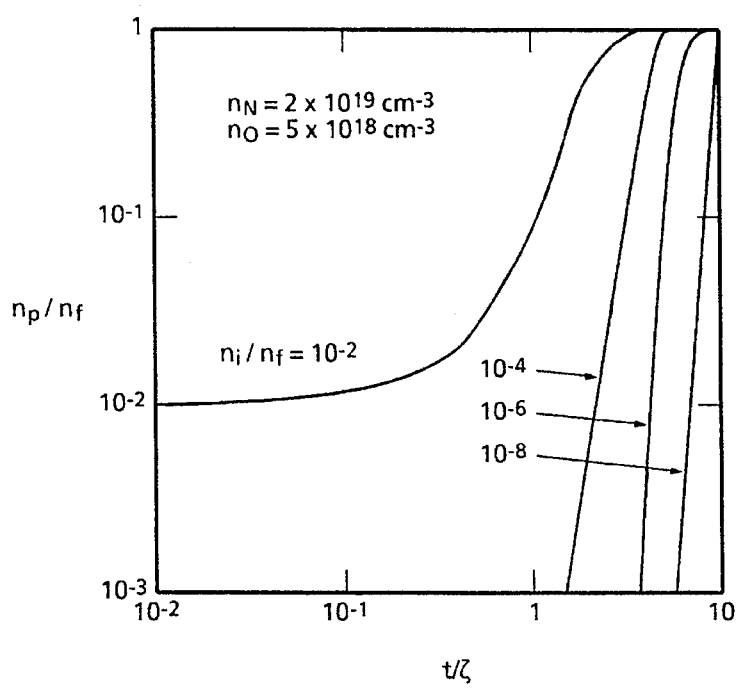

The plasma density profile in time may be evaluated from Equation (15) with the condition of $n_p=n_{pN}+N_{pO}$. The plasma density profile in time, is investigated by use of Equation (10) and an approximation based on a constant coefficient a in Equation (12). Assuming that the initial electron density is $n_i$, Equation (10) is integrated over time t resulting in $$n_p = n_i\frac{1+\tanh(t/\zeta)}{1-(1-2n_i/n_f)\tanh(t/\zeta)}, \tag{17}$$

where $n_f=2/a\zeta$ represents the steady-state plasma density at t=∞. The density of free electrons in the air at the beginning depends on the environmental condition of the air. Shown in FIG. 8 are plots of the normalized electron density $n_p/n_f$ versus the normalized time t/ζ obtained from Equation (17) for several values of the ratio $n_i/n_f$ of the initial and final electron densities. Note that the electron saturation density $n_f$ is independent of the initial electron density $n_i$, although the density saturation time depends very weakly on it. Electron density saturation occurs typically at t=10 ζ as shown in FIG. 8. For the case of $n_i/n_f \ll 1$, which is common in the air-breakdown plasma, Equation (17) is simplified to $$n_p = \frac{n_i n_f}{n_i + n_f \exp(-2t/\zeta)}. \tag{18}$$

Equation (18) agrees with Equation (17) within a one percent margin for a broad range of physical parameters.

Figure 9:
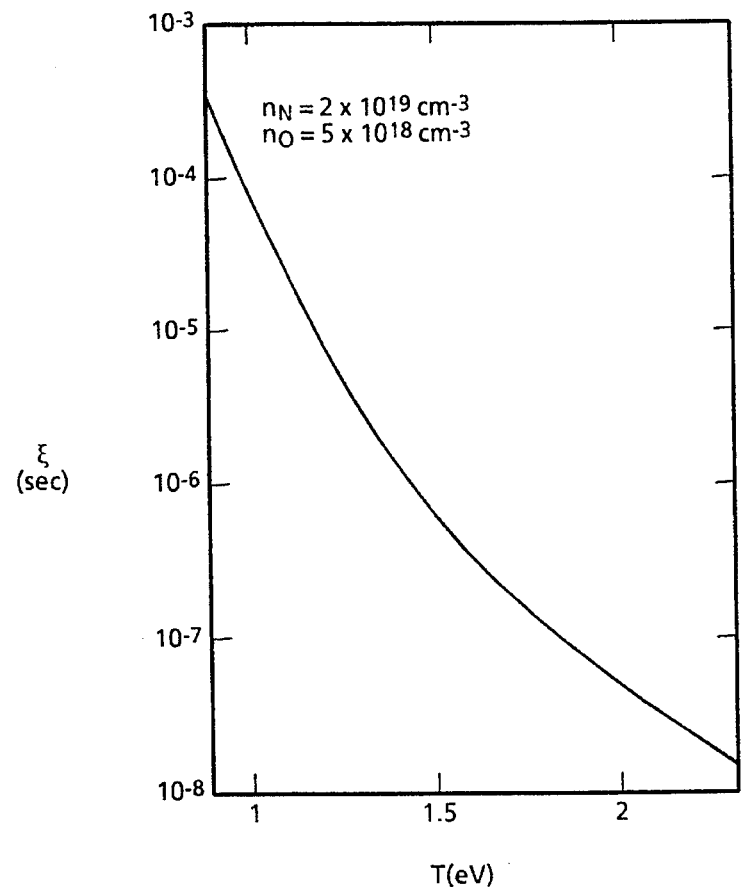

The saturation-time parameter $\zeta$ in Equation (11) is calculated for full air density and the result is graphically presented in FIG. 9. Obviously, the parameter $\zeta$ decreases drastically as the electron temperature T increases. The saturation time of the plasma density is typically given by $t=10\ \zeta$ from FIG. 8. Therefore, the saturation time of a plasma with a temperature of T=0.94 eV is about 1 millisecond (see FIGS. 8 and 9). It will be apparent from the foregoing that the microwave-discharge plasma may not necessarily be uniform in the plasma chamber 24 and that the microwave field intensity is related to the operational mode of the waveguide.

Prime candidates for free radicals in the air purification process of the present invention are oxygen atoms, which eliminate the carbon-based contaminants by oxidation. The oxygen atom density n in the plasma is calculated from the rate equation $$\frac{dn}{dt} = s(T) - \alpha_1 n_p n - \alpha_2 n^2, \tag{19}$$

where s(T) is the source term, and $\alpha_1 n_o n$ and $\alpha_2 n^2$ represents the atomic oxygen loss due to ozone production and due to the recombination of atoms to form diatomic oxygen molecules. As hereinbefore discussed, the dominant recombination of the plasma electron and diatomic oxygen ion is the dissociative recombination process, which creates two oxygen atoms. In the steady-state condition, the density $n_{pO}$ of diatomic oxygen ions based on Equation (15) is obtained from $$\alpha_o n_{po} = n_o \int \sigma_o v f(x) dx. \tag{20}$$

Figure 10:
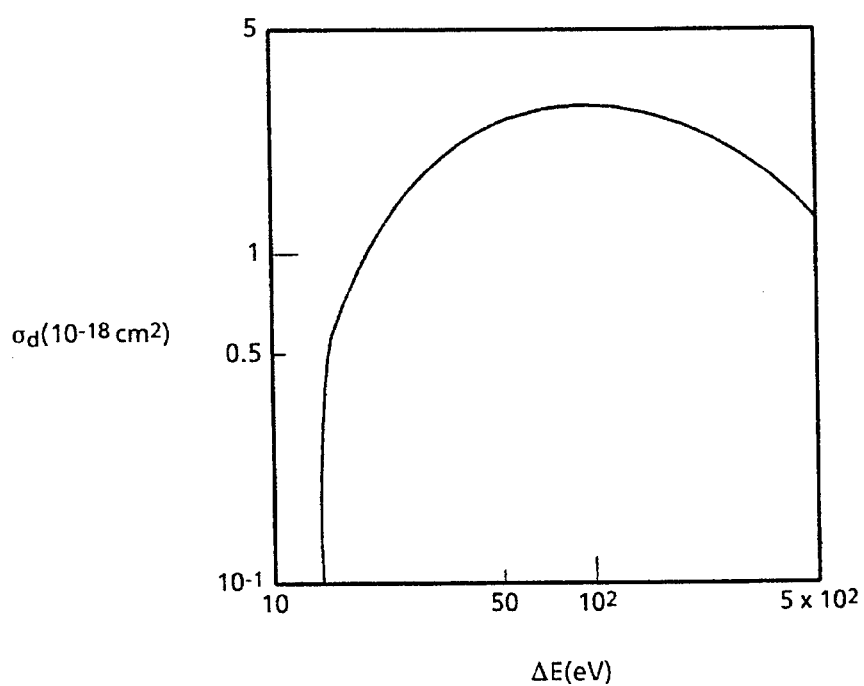

Moreover, plasma electrons also dissociate oxygen molecules, creating additional oxygen atoms. FIG. 10 graphically presents the dissociation cross section $\sigma_d$ of diatomic oxygen molecules by electrons, which is a compilation of theoretical and experimental data. Therefore, the source term s(T) is expressed as $$s(T) = 2n_o n_p \int [\sigma_o(x) + \sigma_d(x)] v f(x) dx, \tag{21}$$

where the dissociation cross section $\sigma_d$ is two orders in magnitude smaller than the ionization cross section $\sigma_o$. The contribution of molecular dissociation to the source term s(T) is negligibly small in this application.

Although plasma generation by microwave breakdown produces a high degree of ionization and dissociation, the electron-to-gas temperature ratio is very high for microwave plasma. In this context, it is assumed that the temperature of oxygen atoms is about 300° K. The recombination coefficient of the oxygen atoms at room temperature is $\alpha_1 = 10^{-14}$ cm$^3$ sec$^{-1}$ for full air density. The measured value $\alpha_1$ of the ozone production is based on the dominant reaction between the oxygen molecules and oxygen atoms in the triplet-P state, $0(^3P)$. In nature, the ratio $\delta$ of the triplet-P state atoms to total oxygen-atom number is very small. However, the ratio $\delta$ in the microwave-discharge plasma may not necessarily be so small. Nevertheless, the ozone production term proportional ratio $\alpha_1$ in Equation (19) is smaller than the recombination term proportional to $\alpha_2$ if the ratio $\delta$ is less than $10^{-3}$ for the oxygen-atom density of $10^{15}$ cm$^{-3}$ or higher.

In order to simplify continued analysis, the term proportional to $\alpha_1$ is neglected. Integrating Equation (19) with respect to time t and making use of the initial condition n=0 at t=0, the oxygen atom density is determined from:

$$n = \sqrt{\frac{s}{\alpha_2}} \tanh\left(\frac{t}{\eta}\right), \tag{22}$$

where the saturation time $\eta$ of the oxygen atom is defined by:

$$\eta = \frac{1}{\sqrt{s\alpha_2}}. \tag{23}$$

In obtaining Equation (22), use has been made of approximations involving a constant value for plasma density $n_p$ and an ozone production term that is negligibly small. The saturated oxygen-atom density is obtained from Equation (22) when the time t is infinite; i.e., $$n(t=\infty) = \sqrt{\frac{s(T)}{\alpha_2}}. \tag{24}$$

Figure 11:
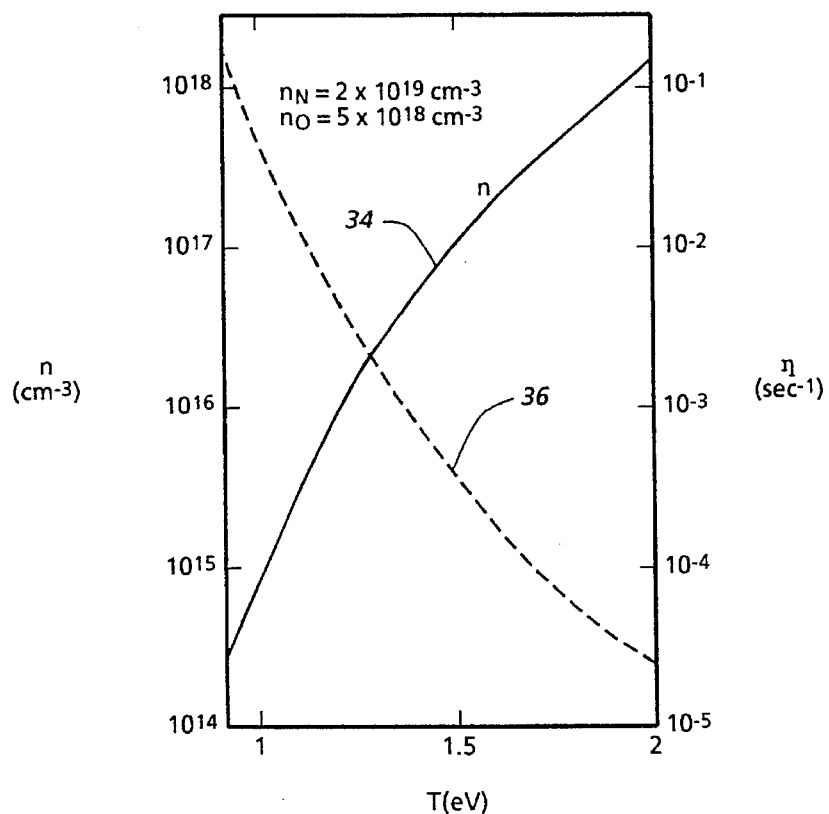

Shown in FIG. 11 are plots of the oxygen-atom density n (solid curve 34) and the saturation time $\eta$ (dashed curve 36) versus the electron temperature T obtained from Equations (23) and (24) for full air density of $2.5 \times 10^{19}$ molecules cm$^{-3}$. The saturated oxygen-atom density is a fast increasing function of the electron temperature, whereas the saturation time $\eta$ decreases as the electron temperature increases. Oxygen-atom density at the electron temperature of 1 eV is approximately given by $n=10^{15}$ cm$^{-3}$. The saturation time of the oxygen-atom density at T=1 eV is found to be $\eta=40$ millisecond, which is about two orders in magnitude longer than the aforementioned plasma saturation time. Thus, the approximation of $n_p$ as a constant in obtaining Equation (22) is well justified. The recombination coefficient of $\alpha_2 = 2.5 \times 10^{-14}$ cm$^3$ sec$^{-1}$ used in calculating the oxygen atom density diagrammed in FIG. 11 is based on the assumption of a carrier gas at room temperature. In reality, the gas temperature in the plasma chamber 24 may be considerably higher than the room temperature, thereby reducing substantially the value of the recombination coefficient. Thus, at the electron temperature of T=1 eV the oxygen-atom density could be somewhat of a factor of a few magnitudes higher than $n=10^{15}$ cm$^{-3}$ and the saturation time $\eta$ could be increased above 40 milliseconds. The saturation time of the oxygen-atom density reduces further if the atomic oxygen loss due to ozone production and other gas kinetics in the rate equation of oxygen atoms are included.

Contaminants in the air are destroyed by oxygen atoms in excited states. Defining the ratio $\gamma$ as the number ratio of oxygen atoms in excited states to total oxygen-atom number, it can be shown that the rate equation of the chemical contaminant with density $n_c$ is expressed as $$\frac{dn_c}{dt} = -k\gamma n n_c, \tag{25}$$

where k is the reaction constant of the chemical contaminant with oxygen atoms. Equation (25) is valid when the reaction between atomic oxygen and the chemical contaminant is of a second order, which is the most common case. Integrating Equation (25) with respect to time t and making use of the initial condition that the contaminant density at the initial time t=0 is $n_c=n_{cO}$, we find $$\tau = \frac{1}{k\gamma n} \ln \left[ \frac{n_{c0}}{n_c(\tau)} \right], \quad (26)$$

where the time $\tau$ represents the life time, during which all the chemicals are eliminated except the remaining density $n_c$.

Air flow rate H through plasma for air purification is expressed as $$H = \begin{cases} \dfrac{\Delta V}{\tau} = \dfrac{k\gamma n \Delta V}{\ln(n_{c0}/n_c)}, & \tau > \eta \\ \dfrac{\Delta V}{\eta}, & \tau < \eta, \end{cases} \quad (27)$$

where $\Delta V$ is the plasma volume. As an example, the volume and density of the plasma generated by a microwave power of P=8 kW are $\Delta V=10^3$ cm$^3$ and $n_p=3\times10^{11}$ cm$^{-3}$. In such case, the electron temperature is about 1 eV and the oxygen atom density is $n=10^{15}$ cm$^{-3}$. Also, the saturation time of oxygen atom density is $\eta=40$ milliseconds. For comparison purposes the life time $\tau=20$ millisecond was calculated for $n=10^{15}$ cm$^{-3}$, $\gamma=5\times10^{-3}$, $n_{c0}/n_c=20$ and $k=3\times10^{-11}$ cm$^3$ sec$^{-1}$, which is a typical value of the reaction constant of contaminants in the air. The density ratio of $n_{c0}/n_c=20$ means that 95 percent of the chemical molecules are eliminated during the life time $\tau$. The saturation time $\eta$ is longer than the life time $\tau$ for most of the chemical contaminants in this particular parameter regime. Therefore, the air flow rate is predominantly determined by the saturation time $\eta$ and is $H=\Delta V/\eta=2.5\times10^4$ cm$^3$ sec$^{-1}$. Of course, the flow rate could be enhanced by a factor of a few magnitudes if the atomic oxygen loss due to ozone production and other gas kinetics is included in the rate equation of oxygen atoms.

The properties of nitrogen gas kinetics has also been investigated in connection with the present invention. The nitrogen atom density N in the plasma is calculated from the rate equation $$\frac{dN}{dt} = S_N(T) - k_1 n_0 N - k_2 N^2, \quad (28)$$

where $s_N(T)$ is the source term at an electron temperature T, $k_1$ is the reaction constant for nitrogen-atom and oxygen-molecule reaction producing oxygen atom and nitrogen monoxide, $k_2$ is the recombination coefficient of nitrogen atoms for forming diatomic nitrogen molecule, and no represents the oxygen molecular density. The second and third terms in Equation (28) are leading terms in the nitrogen gas kinetics for full air density at room temperature. As hereinbefore explained, the dominant recombination of plasma electrons and diatomic nitrogen ions is the dissociative recombination process. Moreover, it has been determined that the dissociation cross section of nitrogen molecules by electrons is one order of magnitude less than the ionization cross section $\sigma_N$ of nitrogen molecules by electrons. Therefore, the source term $S_N(T)$ in Equation (28) may be expressed as $$S_N(T) = 2 n_N n_p \int \sigma_N(x) v f(x) dx, \quad (29)$$

which is considerably less than the source term s(T) in Equation (21) for an electron temperature less than 1.3 eV; see FIG. 7. Also, both source terms s(T) and $s_N(T)$ are the main contributions to the plasma density build-up and are fast increasing functions of the electron temperature T.

The steady-state value of the nitrogen atom density is given by $$N = \sqrt{\left(\frac{k_1 n_0}{2k_2}\right)^2 + \frac{S_N}{k_2} - \frac{k_1 n_0}{2k_2}}. \quad (30)$$

The reaction constants $k_1=10^{-16}$ cm$^3$ sec$^{-1}$ and $k_2=1.8\times10^{-13}$ cm$^3$ sec$^{-1}$ at room temperature was determined from review of prior literature.

Figure 12:
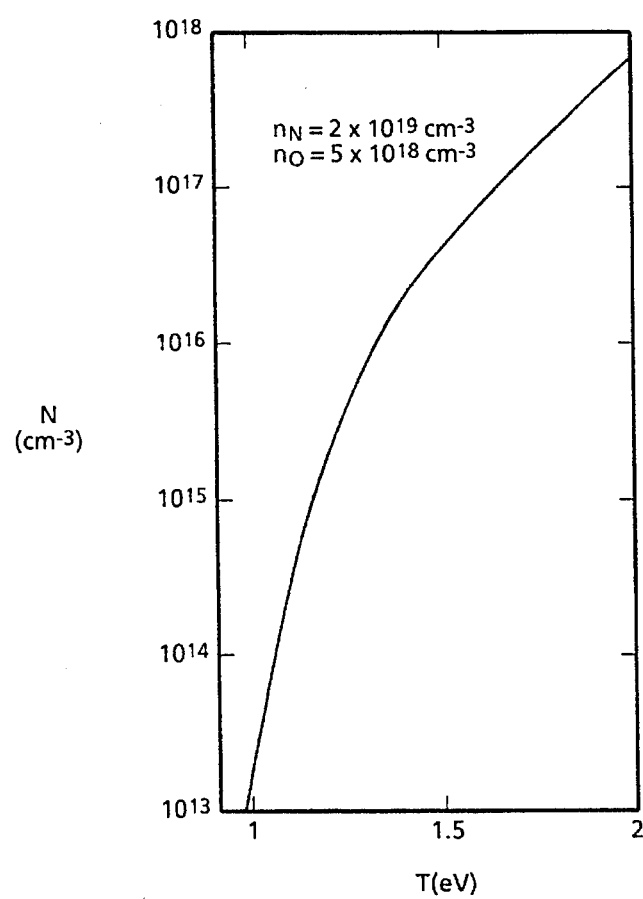

The steady-state density of nitrogen-atoms is graphically presented in FIG. 12 for full air density characterized by $n_N=2\times10^{19}$ cm$^{-3}$ and $n_O=5\times10^{18}$ cm$^{-3}$. The plot of the nitrogen-atom density versus the electron temperature T in FIG. 12 is obtained from Equation (30). The nitrogen-atom density at a low electron temperature of about 1 eV is two orders in magnitude less than the oxygen-atom density. The main reason for a relatively low nitrogen-atom density is a small ionization cross section of nitrogen at a low electron temperature, as shown in FIG. 6. On the other hand, the nitrogen-atom density at a relatively high electron temperature of 2 eV is comparable to or a few factors in magnitude less than the oxygen-atom density. A typical electron temperature in the microwave plasma as hereinbefore pointed out is 1 eV. The low nitrogen-atom density in a microwave-discharge plasma means that less nitrogen atoms are available in forming nitrogen oxides, which is particularly advantageous in controlling toxic by-products. The reaction between nitrogen atoms and oxygen molecules produces additional oxygen atoms, which is represented by the second term in the right-hand side of Equation (28). The correction of oxygen-atom density associated with this term is less than a few percent for the entire electron-temperature range.

Based on the foregoing description, a method for purifying large volumes of highly-contaminated air has been disclosed involving the use of a weakly-ionized plasma generated in apparatus 10 by continuous high-power microwaves from generator 12. Assuming that a plasma volume of $10^3$ cm$^3$ is generated by a microwave power of 8 kW, the plasma electron temperature and density are calculated to be T=1 eV and $n_p=5\times10^{11}$ cm$^{-3}$ for full atmospheric pressure inside the plasma chamber 24. Air breakdown and plasma generation occur at the resonance frequency of the chamber 24 and slow-waveguide apparatus 10. The group velocity of the microwaves vanishes at the resonance frequency, transferring microwave energy efficiently into the plasma. The dielectric constant of the aforementioned weakly-ionized plasma is very close to unity for microwaves at a frequency higher than 1 GHz. Since the ionization cross section of diatomic oxygen molecules by-low-energy electrons is dominantly larger than that of nitrogen molecules, the oxygen-plasma density is one order in magnitude higher than the nitrogen-plasma density at a low plasma-electron temperature of less than 1.1 eV in accordance with the present invention as compared to the nitrogen-plasma density at an electron temperature higher than 2 eV when it is comparable to a higher than the oxygen-plasma density. The oxygen-plasma density saturation time of a plasma volume of $10^3$ cm$^3$ generated by a microwave power of 8 kW is about 1 millisecond.

The dominant recombination process for the plasma electrons and diatomic oxygen ions in the weakly-ionized plasma is of the dissociative type which creates two oxygen atoms per each electron-ion recombination. Assuming that most atomic-oxygen loss is due to the recombination of oxygen atoms in forming molecules, a simple rate equation has been developed for the oxygen atoms. In a plasma volume of $10^3$ cm$^3$ generated by the microwave power of 8 kW, the oxygen-atom density at an electron temperature of 1 eV is approximately given by $n=10^{15}$ cm$^{-3}$. The saturation time of the oxygen-atom density in this case is about 40 milleseconds. The saturation time could be shortened by a factor of few magnitudes. The nitrogen-atom density at a low electron temperature of about 1 eV is two orders in magnitude less than the oxygen-atom density. The main reason for a relatively low nitrogen-atom density originates from the small ionization cross section of nitrogen at a low electron temperature. The low nitrogen-atom density in the microwave-discharge plasma means less availability of nitrogen atoms in forming nitrogenous oxides. In the case of a volume of $10^3$ cm$^3$ plasma generated by a 8 kW microwave power, the saturation time of the oxygen-atom density requires supply of air by pump 16 at an air flow rate of $2.5 \times 10^4$ cm$^3$ sec$^{-1}$ under the given conditions to achieve air purification. Accordingly, large scale generation of plasma by a continuous high-power microwave generator 12 is effective to purify large volumes of highly-contaminated air.

Numerous other modifications and variations of the present invention are possible in light of the foregoing teachings. It is therefore to be understood that within the scope of the appended claims the invention may be practiced otherwise than as specifically described.

What is claimed is:

1. Apparatus for purifying contaminated air, comprising: a source of microwave energy, a waveguide having a dielectric chamber operatively connected to said source, means conducting the contaminated air through the dielectric chamber of the waveguide for exposure to said microwave energy causing sequential ionization and recombination of the air into atomic oxygen and atomic nitrogen, and saturation control means for limiting said recombination to a saturation period during which the atomic oxygen attains a dominant saturation density level.

2. The apparatus as defined in claim 1 wherein said saturation control means includes pump means for regulating inflow of the contaminated air into the waveguide at a flow rate establishing said saturation period and an electron temperature therein under which the atomic nitrogen attains a density level substantially less than the dominant saturation density level of the atomic oxygen.

3. In a system for purifying gas within a waveguide cavity by positioning a body of the gas within said cavity; transferring microwave energy to the body of the gas positioned within the waveguide cavity for sequential ionization thereof into ionized products and recombination of the ionized products; and limiting said recombination of the ionized products, the improvement residing in said gas being contaminated air from which atomic oxygen is formed during a predetermined saturation time by said recombination of the ionized products, a source from which said waveguide cavity receives the microwave energy transferred to the body of contaminated air, means conducting flow of the body of contaminated air through the waveguide cavity for exposure thereof to the microwave energy effecting said sequential ionization and recombination of the ionized products, and saturation control means regulating said flow of the body of the contaminated air for obtaining a saturation density level of the atomic oxygen within the waveguide cavity during the predetermined saturation time as a result of said limiting of the recombination of the ionized products.

4. In a system having a source of microwave energy, a waveguide connected to said source, and means conducting gas through the waveguide for exposure to the microwave energy therein causing sequential ionization of the gas into ionized products and recombination of the ionized products, the improvement residing in means controlling time of said exposure of said gas to the microwave energy for limiting said recombination of the ionized products, including means for regulating inflow of the gas into the waveguide at a predetermined flow rate.

5. The system as defined in claim 4 wherein said gas is contaminated air from which atomic oxygen and atomic nitrogen is attained by said recombination of the ionized products, said predetermined flow rate of the gas into the waveguide establishing a dominant saturation density level of the atomic oxygen during a saturation period while the atomic nitrogen attains a density level substantially less than the saturation density level of the oxygen.

6. In a system of purifying contaminated air by exposure thereof to microwave energy within an electric field causing breakdown of the contaminated air into ionization products, the improvement residing in: means for controlling exposure time of the contaminated air within the electric field during which recombination of the ionization products into a discharge plasma occurs.

7. The improvement as defined in claim 6, wherein said means for controlling exposure time includes: means regulating inflow of the contaminated air into the electric field at a predetermined flow rate for limiting said recombination of the ionization products.

* * * * *